United States Patent [19]

Fujiki et al.

[11] Patent Number: 6,140,446
[45] Date of Patent: Oct. 31, 2000

[54] HYDROSILYLATION CATALYSTS AND SILICONE COMPOSITIONS USING THE SAME

[75] Inventors: Hironao Fujiki; Kei Miyoshi; Hironobu Muramatsu, all of Gunma-ken, Japan

[73] Assignee: Shin-Etsu Chemical Co., Ltd., Tokyo, Japan

[21] Appl. No.: 09/186,355

[22] Filed: Nov. 5, 1998

[30] Foreign Application Priority Data

Nov. 18, 1997 [JP] Japan .................................. 9-333540

[51] Int. Cl.$^7$ .......................... C08G 77/08; C08G 77/12; C08G 77/20
[52] U.S. Cl. .................................. 528/15; 528/32; 528/20; 528/23; 528/31; 502/339; 523/211
[58] Field of Search .................................. 528/15, 32, 20, 528/23, 31; 556/450; 568/700, 38; 523/211; 502/325

[56] References Cited

U.S. PATENT DOCUMENTS

| | | |
|---|---|---|
| 3,445,420 | 5/1969 | Kookootsedes et al. . |
| 3,699,073 | 10/1972 | Wada et al. . |
| 4,061,609 | 12/1977 | Bobear . |
| 4,481,341 | 11/1984 | Schlak et al. . |
| 4,874,667 | 10/1989 | Lee et al. . |
| 5,009,957 | 4/1991 | Lee et al. . |
| 5,015,716 | 5/1991 | Togashi et al. . |
| 5,017,654 | 5/1991 | Togashi et al. . |

FOREIGN PATENT DOCUMENTS

| | | |
|---|---|---|
| 0257970 | 3/1988 | European Pat. Off. . |
| 0543410 | 5/1993 | European Pat. Off. . |
| 0661349 | 7/1995 | European Pat. Off. . |
| 15-5069 | 11/1940 | Japan . |
| 19-1476 | 12/1944 | Japan . |
| 46-10947 | 3/1971 | Japan . |
| 49-134786 | 12/1974 | Japan . |
| 57-20340 | 4/1982 | Japan . |
| 5837053 | 3/1983 | Japan . |
| 63-56563 | 3/1988 | Japan . |
| 64-51140 | 2/1989 | Japan . |
| 2-14244 | 1/1990 | Japan . |
| 2-9448 | 1/1990 | Japan . |
| 5-202193 | 8/1993 | Japan . |
| 7-196921 | 8/1995 | Japan . |

Primary Examiner—Margaret G. Moore
Assistant Examiner—Kuo-Liang Peng
Attorney, Agent, or Firm—Birch, Stewart, Kolasch & Birch, LLP

[57] ABSTRACT

A hydrosilylation catalyst is provided wherein a platinum catalyst is enclosed in a heat-fusible compound having a melting point of 40–200° C. and containing an aliphatic unsaturated bond, carbonyl, carboxyl or thioether radical in a molecule. The catalyst is blended in organo-polysiloxane to form a silicone composition having both shelf stability and fast-curing capability.

10 Claims, No Drawings

HYDROSILYLATION CATALYSTS AND SILICONE COMPOSITIONS USING THE SAME

BACKGROUND OF THE INVENTION

1. Field of the Invention

This invention relates to novel hydrosilylation catalysts and silicone compositions having the same blended therein.

2. Background Art

From the past, addition reaction between aliphatic unsaturated bonds and hydrosilyl radicals promoted by platinum group metal catalysts is utilized in a variety of applications. Inter alia, platinum compounds which contain platinum atom as a catalytic metal are used as catalytic compounds finding the most versatility in the field. Beside organic synthetic reaction such as synthesis of silalkane bonds, platinum compounds are also utilized in the silicone industry as means for crosslinking addition reaction type resins and rubbers. Applications include use as adhesives, coating agents, potting agents, gelling agents, and foaming agents, and extrusion, compression molding or injection molding of liquid or millable rubbers. In these fields, a fast-curing composition having a long shelf life is demanded from the working and operating standpoints.

For compositions utilizing addition reaction as the crosslinking system, a number of proposals have been made on controlling agents for controlling the shelf life and pot life of platinum catalysts. The controlling agents proposed heretofore include benzotriazole compounds (JP-B 25069/1965 corresponding to U.S. application Ser. No. 202,974 filed Jun. 18, 1962), acetylene alcohol compounds (JP-B 31476/1969 corresponding to U.S. Pat. No. 3,445,420), vinyl-containing polysiloxane compounds (JP-B 10947/1973 corresponding to U.S. Pat. No. 3,699,073), hydroperoxides (JP-B 20340/1982 corresponding to U.S. Pat. No. 4,061,609), and amine compounds (JP-A 56563/1988 corresponding to EP 257,970). However, such chemical control has a limit in finding a compromise between pot life and curing rate, failing to meet the current market demand for prolonged storage and fast curing.

From the above standpoint, an attempt was made to enclose platinum catalysts in thermoplastic resins or silicone resins so that the catalysts may be released to silicone compositions at elevated temperature causing the thermoplastic resins or silicone resins to be melted. This technology is disclosed in many patents, for example, JP-A-134786/1974, JP-A 37053/1983 corresponding to U.S. Pat. No. 4,481,341, JP-A 51140/1989 corresponding to U.S. Pat. No. 4,874,667 and U.S. Pat. No. 5,009,957, JP-A 9448/90 corresponding to U.S. Pat. No. 5,015,716, JP-A 14244/1990 corresponding to U.S. Pat. No. 5,017,654, JP-A 202193/1993 corresponding to EP 543,410, and JP-A 196921/1995 corresponding to EP 661,349.

The encapsulation of platinum catalysts in thermoplastic resins or silicone resins, however, has several drawbacks. There occurs a time lag until the resins are dissolved. Although the thermoplastic resins or silicone resins have a good film-forming capability because of high molecular weight substances, there also occurs a time lag in dissolution temperature unless their molecular weight distribution is controlled. A substantial variation occurs between synthesis lots.

Therefore, an object of the invention is to provide a novel hydrosilylation catalyst for curing of room temperature or heat curing type silicone compositions, which has a long storage life, fast-curing capability, ease of preparation, and consistent quality among lots. Another object is to provide a silicone composition having the hydrosilylation catalyst blended therein, which invites little or no time lag with respect to curing temperature and reaction rate.

SUMMARY OF THE INVENTION

We have attempted to prepare a hydrosilylation catalyst by enclosing or embedding a platinum catalyst in a compound having sharp heat fusion characteristics instead of the conventional high molecular weight thermoplastic resins. More particularly, a platinum catalyst is enclosed or embedded in a compound having a melting point in the range of 40 to 200° C. and containing in a molecule at least one structure or radical selected from the class consisting of an aliphatic unsaturated bond, carbonyl radical, carboxyl radical, and thioether radical and especially, having a molecular weight of up to 1,000. By enclosure or embedment, the hydrosilylation catalyst is typically obtained in microcapsule form. Using this hydrosilylation catalyst, a silicone composition having both shelf stability and fast-curing characteristics is obtained.

In a first aspect, the invention provides a hydrosilylation catalyst comprising 0.1 to 50% by weight calculated as platinum atom of a platinum catalyst. The platinum catalyst is enclosed in a compound having a melting point of 40 to 200° C. and containing in a molecule at least one structure or radical selected from the class consisting of an aliphatic unsaturated bond, carbonyl radical, carboxyl radical, and thioether radical.

In a second aspect, the invention provides a silicone composition comprising as essential components (A) an organopolysiloxane containing at least two alkenyl radicals or at least two hydroxyl radicals or both in a molecule, (B) an organohydrogenpolysiloxane containing at least two hydrogen atoms each directly attached to a silicon atom in a molecule, and (C) the hydrosilylation catalyst. Component (B) is blended in such an amount that 0.4 to 20 mol of silicon atom-attached hydrogen atoms are available per 1 mol of the sum of alkenyl and hydroxyl radicals in component (A). Component (C) is blended in such an amount that 0.1 to 1,000 parts by weight of platinum atom is available per million parts by weight of components (A) and (B) combined.

DETAILED DESCRIPTION OF THE INVENTION

The hydrosilylation catalyst of the invention contains 0.1 to 50% by weight calculated as platinum atom of a platinum catalyst. The platinum catalyst is enclosed or embedded in a heat-fusible compound having a melting point of 40 to 200° C. and containing in a molecule at least one structure or radical selected from the class consisting of an aliphatic unsaturated bond, carbonyl radical, carboxyl radical, and thioether radical.

The platinum catalyst of the present invention includes platinum element (single substance), platinum compounds, and complexes derived therefrom.

The platinum catalyst used herein may be any of conventional well-known catalysts, for example, platinum black, platinum chloride, chloroplatinic acid and complexes derived therefrom. Illustrative examples include platinum black, chloroplatinic acid, alcohol-modified products of chloroplatinic acid, and complexes of chloroplatinic acid with olefins, aldehydes, vinyl siloxanes and acetylene alcohols. Of these, platinum complexes of vinyl siloxanes are preferred.

The amount of the platinum catalyst used is 0.1 to 50%, preferably 0.1 to 10%, more preferably 0.2 to 5% by weight, expressed as platinum atom, based on the entire weight of the hydrosilylation catalyst obtained after encapsulation in the heat-fusible compound. With less than 0.1% of platinum atom, the concentration of the heat-fusible compound in the composition or reaction system becomes relatively so high as to give a non-negligible influence on the physical properties of a silicone composition. With more than 50% of platinum atom, the concentration of the heat-fusible compound or carrier becomes so low that the resultant hydrosilylation catalyst may act similarly to conventional platinum catalysts, providing addition reaction curing type silicone compositions with a short pot-life and shelf instability.

The heat-fusible compound should have a melting point of 40° C. to 200° C., preferably 40° C. to 150° C., more preferably 40° C. to 100° C. Compounds with a melting point of lower than 40° C. may melt when ambient or room temperature rises. Compounds with a melting point of higher than 200° C. may require a large amount of heat on use and thus be commercially impractical. The heat-fusible compound is a hydrocarbon compound which contains in its molecule at least one structure or radical selected from an aliphatic unsaturated bond, carbonyl radical, carboxyl radical, and thioether radical and which may optionally contain an organosilyl, organosiloxanyl or organosiloxane radical.

In the heat-fusible compounds, the aliphatic unsaturated bonds include an aliphatic double bond represented by C═C (alkenyl structure) and an aliphatic triple bond represented by C≡C (alkynyl structure). The carbon atom having such an aliphatic multiple bond may be positioned at a molecular end (that is, a terminal multiple bond represented by CHR═CR— or HC≡—C— wherein R is hydrogen or a substituted or unsubstituted monovalent hydrocarbon radical) or within a molecule (that is, an intramolecular multiple bond represented by —CR═CR— or —C≡C—). Of these compounds, those having an aliphatic unsaturated bond and an aromatic ring such as an aryl radical, aralkyl radical (phenyl or naphthyl skeleton) or arylene radical (phenylene or naphthylene skeleton).

Also the heat-fusible compounds should preferably have a molecular weight of up to 1,000, especially 50 to 500. Compounds with a molecular weight of more than 1,000 would show a blunt melting temperature and be thus unsuitable for providing a sharp curing profile.

Examples of the heat-fusible compound which can be used herein include 2-butyne-1,4-diol, diphenylacetylene, 4-hexylresorcin, 2-vinylnaphthalene, 2-acetyl-1-tetralone, 2,5-diphenyloxazole, 2,5-toluquinone, 3,6-dimethyl-4-octyne-3,6-diol, 2,5-dimethyl-3-hexyne-2,5-diol, 1,3-bis (trimethylsilylethynyl)benzene, and thiochroman-4-ol.

The hydrosilylation catalyst of the invention is preferably prepared by contacting the platinum catalyst with the heat-fusible compound in a molten or dissolved state. The molten state is obtained by heating the compound at or above its melting point. The dissolved state is obtained by uniformly dissolving or dispersing the compound in a solvent. The platinum catalyst is carried on the compound in either state. The mass is solidified by cooling or distilling off the solvent. There is obtained a solid catalyst having the platinum catalyst uniformly dispersed therein. Alternative methods include a spray drying method in which the mass in a liquid state resulting from melting or dissolution is sprayed in mist, followed by solidification or solvent removal to yield microparticulates (or microcapsulates); an emulsifying method in which the mass is emulsified in water with the aid of an emulsifier, obtaining a solid catalyst; and a freeze drying method in which the mass dissolved in the solvent is cooled below the solidification temperature of the solvent, followed by solvent removal in vacuum to yield a solid catalyst.

The thus obtained solid catalyst may take a powder form or a solution or dispersion form by dissolving or dispersing it in solvents or silicone fluid again. The solvents used herein are preferably those which are not fully compatible with an organopolysiloxane as the base of a silicone composition at room temperature (about 5 to 35° C).

It is noted that some of the acetylene alcohols mentioned in the prior art fall in the scope of the heat-fusible compounds according to the invention, the prior art acetylene alcohols are liquid at room temperature or well soluble in polysiloxanes. The present invention is distinguishable over the prior art in that a platinum compound is previously coordinated to such a compound to form a solid (at room temperature) mass containing the platinum compound, which is mechanically dispersed or dissolved in a solvent and added to a polysiloxane composition for microscopic re-precipitation and dispersion, thereby forming in the composition a platinum catalyst enclosed in the compound having a melting point. Of the heat-fusible compounds which are solid at room temperature, those compounds having aliphatic multiple (double or triple) bonds are preferred when a change of catalytic activity over a long term of storage is taken into account. More preferred are those compounds having aromatic ring structures, for example, aryl radicals such as phenyl, tolyl, xylyl, ethylphenyl and naphthyl, aralkyl radicals (phenyl and naphthyl skeletons) such as benzyl, phenylethyl and phenylpropyl, and arylene radicals (phenylene and naphthylene skeletons) such as phenylene, tolylene, xylylene and naphthylene, which are relatively insoluble in siloxane polymers. The platinum catalyst-containing compound according to the invention may be further enclosed or embedded in another resin having an appropriate softening point or melting point for a particular application such as a silicone resin or vinyl polymer.

Unexpected advantages are obtained when the hydrosilylation catalyst of the invention is used in a silicone composition. When the silicone composition as finally blended is mechanically re-dispersed in a paint roll mill, for example, the curing rate of the silicone composition is increased without reducing the pot life, as opposed to the prior art platinum catalysts enclosed in thermoplastic reins or silicone resins. More illustratively, when microcapsules are formed using prior art polymers, it is believed that mechanical dispersion can disrupt the capsule walls to expose the catalyst so that reaction is promoted and the pot life is reduced to zero. The present invention is successful in increasing only the curing rate, avoiding the prior art problem of concurrently reducing the pot life. Then an overall manufacturing process need not avoid the mechanical shearing step subsequent to the catalyst admixing step.

In one exemplary application, the hydrosilylation catalyst of the invention is used in a room temperature or heat curing type silicone composition which will cure into an elastomer (or rubbery elastomer), gel or foam (or sponge). The silicone composition is typically formulated as comprising (A) 100 parts by weight of an organopolysiloxane containing at least two alkenyl radicals an/or at least two hydroxyl radicals in a molecule, (B) an organohydrogenpolysiloxane containing at least two hydrogen atoms each directly attached to a silicon atom in a molecule, in such an amount that 0.4 to 20 mol of silicon atom-attached hydrogen atoms are available per 1 mol of the sum of alkenyl and hydroxyl radicals in component (A), (C) the inventive hydrosilylation catalyst in such an amount that 0.1 to 1,000 parts by weight of platinum atom is available per million parts by weight of components (A) and (B) combined, (D) 0 to 10 parts by weight of an addition reaction retarder, and (E) 0 to 200 parts by weight of a filler.

Component (A) is typically an organopolysiloxane represented by the average compositional formula.

$$R_a SiO_{(4-a)/2}$$

In the formula, R is a substituted or unsubstituted monovalent hydrocarbon radical having 1 to 10 carbon atoms, more preferably 1 to 8 carbon atoms or hydroxyl radical. Examples of the substituted or unsubstituted monovalent hydrocarbon radical represented by R include alkyl radicals such as methyl, ethyl, propyl, isopropyl, butyl, isobutyl, tert-butyl, pentyl, hexyl, cyclohexyl, octyl, nonyl, and decyl; alkenyl radicals such as vinyl, allyl, propenyl, butenyl, and hexenyl; aryl radicals such as phenyl and tolyl; aralkyl radicals such as benzyl and phenylethyl; and substituted ones of the foregoing radicals in which some or all of the hydrogen atoms attached to carbon atoms are replaced by halogen atoms or cyano radicals, such as chloromethyl, bromoethyl, cyanoethyl, and 3,3,3-trifluoropropyl. Letter a is a positive number of 1.85 to 2.3, preferably 1.9 to 2.05.

In the organopolysiloxane as component (A), the alkenyl and hydroxyl radicals are functional radicals contributing to crosslinking reaction. The content of alkenyl and/or hydroxyl radicals should be 0.001 to 5 mol %, preferably 0.01 to 2 mol % based on the entire silicon atom-attached monovalent radicals R in a molecule. With less than 0.001 mol % of functional radicals, molded parts as cured become weak and lack strength, failing to function as rubbery elastomer. More than 5 mol % of functional radicals leads to an excessive crosslinked density so that cured parts become brittle.

Usually, the organopolysiloxane has a viscosity of about 100 to 1,000,000 centipoise, preferably about 100 to 100,000 centipoise, more preferably about 100 to 10,000 centipoise although the viscosity is not critical. For low viscosity applications, it is recommended to use organopolysiloxanes having a viscosity of about 100 to 5,000 centipoise. These organopolysiloxanes may be prepared by prior art well-known methods.

Among the functional radicals contributing to crosslinking reaction, the hydroxyl radicals are preferably attached to only the silicon atoms at both ends of the molecular chain while the alkenyl radicals may be attached to either of silicon atoms at an end or midway of the molecular chain or both. In view of cured properties, it is preferred that there are contained at least alkenyl radicals attached to the silicon atoms at both ends of the molecular chain.

Most often, the organopolysiloxane as component (A) has a linear structure having a backbone consisting essentially of recurring diorganosiloxane units and blocked at either end of its molecular chain with a triorganosilyl or diorganohydroxysilyl radical although it may partially contain a branched structure or have a cyclic structure.

Illustrative examples of the organopolysiloxane (A) are given below.

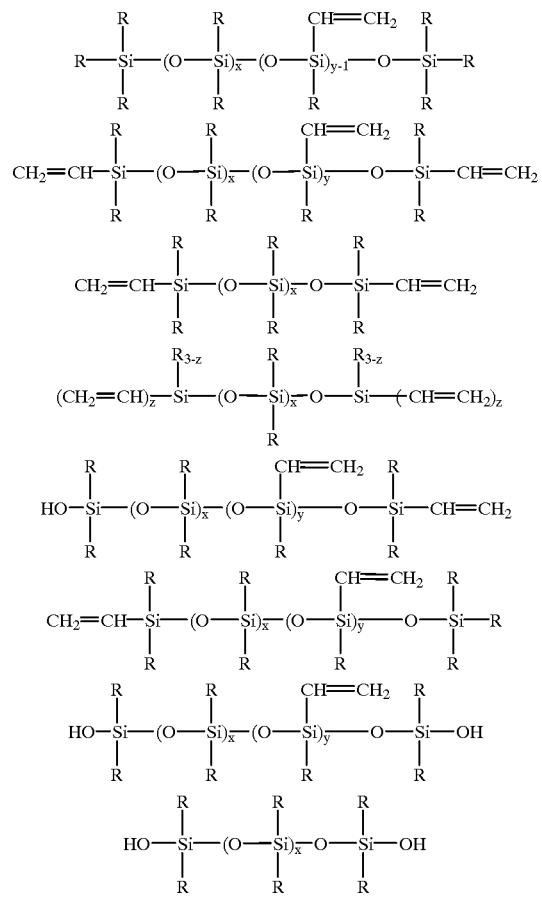

In the formulas, R is as defined above and preferably radicals other than alkenyl and hydroxyl. Letter x is a number of 1 to 5,000, preferably 10 to 2,000, y is a number of 1 to 200, preferably 1 to 100, the sum of x+y is 10 to 5,000, preferably 15 to 2,000. z is 2 or 3.

Component (B) is an organohydrogenpolysiloxane containing at least two, preferably at least three hydrogen atoms each directly attached to a silicon atom (that is, SiH radicals) in a molecule. The organohydrogenpolysiloxane is typically represented by the following average compositional formula.

$$R^1_b H_c SiO_{(4-b-c)/2}$$

In the formula, $R^1$ is a substituted or unsubstituted monovalent hydrocarbon radical having 1 to 10, preferably 1 to 8 carbon atoms. Examples of $R^1$ include those as exemplified for R, preferably such a radical free of an aliphatic unsaturated bond. Letter b is a positive number of 0.7 to 2.2, preferably 1 to 2, c is a positive number of 0.005 to 1.2, preferably 0.01 to 1, and the sum of b+c is from 0.8 to 3, preferably 1 to 2.4.

With respect to molecular structure, the organohydrogenpolysiloxanes may be linear, branched, cyclic or three-dimensional network structure (resinous). The silicon atom-attached hydrogen atoms (or SiH radicals) may be positioned at an end or midway of the molecular chain or both. The number of silicon atoms in a molecule, that is, the degree of polymerization is preferably about 2 to 400, more preferably about 4 to 150.

The amount of SiH radicals in component (B) is such that 0.4 to 20 mol, preferably 0.4 to 10 mol, more preferably 0.5 to 2.5 mol of SiH radicals are available per 1 mol of the sum of alkenyl and hydroxyl radicals in component (A). When it is desired to obtain a foam, it is recommended that 2 to 20 mol of SiH radicals are available per 1 mol of the sum of alkenyl and hydroxyl radicals in the composition.

Also preferably, the total of the number of alkenyl and hydroxyl radicals per molecule of component (A) and the number of SiH radicals per molecule of component (B) is at least 5. This ensures that a three-dimensional crosslinked structure is formed at the end of hydrosilylation or dehydrogenation reaction, thereby inducing curing into an elastomer. No sufficient crosslinked structure is formed if the amount of SiH radicals in component (B) is less than 0.4 mol or more than 20 mol per 1 mol of the sum of alkenyl and hydroxyl radicals in component (A).

Component (C) is the hydrosilylation catalyst of the invention and is blended in such an amount that 0.1 to 1,000 parts by weight of platinum atom is available per million parts by weight of components (A) and (B) combined. Less than 0.1 ppm of platinum atom does not promote curing reaction whereas more than 1,000 ppm of platinum atom is uneconomical.

If desired for controlling hydrosilylation reaction, an addition reaction retarder (D) is blended in the silicone composition in an amount of 0 to about 10 parts, preferably about 0.001 to about 5 parts by weight per 100 parts by weight of component (A). The addition reaction retarder may be selected from vinyl-containing organopolysiloxanes, acetylene alcohol, triallyl isocyanurate, alkyl maleates, hydroperoxide, tetramethylethylenediamine, benzotriazole and mixtures thereof. The addition reaction retarder is effective in controlling a minor amount of the platinum catalyst that is liberated from the heat-fusible compound in component (C) during a long-term storage of the composition in one-part form, and in controlling a platinum compound that is added to insure initial expansion when it is desired to produce a foam from the composition.

Also, for increasing the physical strength and hardness of silicone elastomer, a filler (E) is blended in the silicone composition in an amount of 0 to about 800 parts, preferably about 1 to about 200 parts by weight per 100 parts by weight of component (A). The filler may be selected from powdery fired silica (or fumed silica), powdery precipitated silica, quartz flour, alumina, aluminum hydroxide, carbon black, silver powder, gold powder, magnesium compounds, zinc oxide, and zinc carbonate.

As long as the objects of the invention are not impaired, various additives may be blended in the silicone composition. For example, compounds having at least one radical selected from alkoxysilyl, epoxy, hydrosilyl, acryl, and hydroxysilyl radicals, or mixtures thereof may be blended as a tackifier ingredient (or an adhesive agent); non-reactive organopolysiloxanes may be blended as a diluent or viscosity adjusting agent or hardness-adjusting agent. Other useful additives are coloring agents including inorganic pigments such as cobalt blue and organic dyestuffs such as azo and anthracene dyestuffs, and heat resistance or flame retardance modifiers such as cerium oxide, zinc carbonate, manganese carbonate, iron oxide, titanium oxide, and carbon black.

In curing the silicone composition, it is often heated at a temperature of about 60 to 200° C. for about 2 to 20 minutes. When it is desired that the silicone composition cures at room temperature, a solvent capable of dissolving the encapsulating compound of the hydrosilylation catalyst is added to the composition whereby hydrosilylation and/or dehydrogenation reaction is promoted so that curing may take place even at low temperature without a need for heating.

The hydrosilylation catalyst of the invention, when blended with silicone, gives a silicone composition which has improved storage stability, maintains fast-curing potential, undergoes little time lag in curing temperature and curing rate. The catalyst is easy to prepare and consistent in quality among different lots.

EXAMPLE

Examples of the invention are given below by way of illustration and not by way of limitation.

Synthesis Example 1

To 5 g of 3,6-dimethyl-4-octyne-3,6-diol (melting point 54° C.) was added 5 g of a toluene solution of a vinyl-containing siloxane complex derived from chloroplatinic acid. The mixture was heat treated at 80° C. for one hour, stripped, and cooled, yielding a solid hydrosilylation catalyst (platinum atom content: 0.5% by weight).

Synthesis Example 2

To 2.5 g of 3,6-dimethyl-4-octyne-3,6-diol (melting point 54° C.) was added 5 g of a toluene solution of a vinyl-containing siloxane complex derived from chloroplatinic acid. The mixture was heat treated at 80° C. for one hour, stripped, and cooled. The product was combined with 2.5 g of dimethylpolysiloxane having a viscosity of 1,000 centistokes at 25° C. and roll milled, yielding a hydrosilylation catalyst (platinum atom content: 0.5% by weight) in paste form.

Synthesis Example 3

To 5 g of 3,6-dimethyl-4-octyne-3,6-diol (melting point 54° C.) was added 10 g of a toluene solution of a vinyl-containing siloxane complex derived from chloroplatinic acid. The mixture was heat treated at 80° C. for one hour, stripped, cooled, and spray dried, yielding a hydrosilylation catalyst (platinum atom content: 0.7% by weight) in fine powder form.

Synthesis Example 4

To 5 g of thiochroman-4-ol (melting point 69° C.) were added 5 g of a toluene solution of a vinyl-containing siloxane complex derived from chloroplatinic acid and 5 g of toluene as a solvent. The mixture was heat treated at 80° C. for one hour. The mixture was emulsified in water along with 0.5 g of a polyglycerine surfactant, followed by filtration, yielding a hydrosilylation catalyst (platinum atom content: 0.5% by weight) in fine powder form.

Synthesis Example 5

To 5 g of 2-acetyl-1-tetralone (melting point 56° C.) was added 5 g of a toluene solution of a vinyl-containing siloxane complex derived from chloroplatinic acid. The mixture was heat treated at 80° C. for one hour, stripped, and cooled, yielding a solid hydrosilylation catalyst (platinum atom content: 0.5% by weight).

Synthesis Example 6

To 10 g of 2,4,7,9-tetramethyl-5-decyne-4,7-diol (melting point 44° C.) were added 4 g of a toluene solution of a vinyl-containing siloxane complex derived from chloroplatinic acid and 6 g of phenyl-containing trisiloxane. The mixture was heat treated at 80° C. for one hour, stripped, and cooled, yielding a hydrosilylation catalyst (platinum atom content: 0.2% by weight) in paste form.

Synthesis Example 7

To 5 g of 1,3-bis(trimethylsilylethynyl)benzene (melting point 58° C.) was added 5 g of a toluene solution of a vinyl-containing siloxane complex derived from chloroplatinic acid. The mixture was heat treated at 80° C. for one hour, stripped, and cooled, yielding a solid hydrosilylation catalyst (platinum atom content: 0.5% by weight).

Example 1

The following components were mixed: 100 g of dimethylpolysiloxane blocked with a dimethylvinylsiloxy radical at each end of its molecular chain and having a viscosity of 30,000 centistokes at 25° C., 1.8 g of methylhydrogenpolysiloxane of the following average molecular formula (1), 10 g of fumed silica surface treated with dimethyldichlorosilane and having a specific surface area (by BET method) of 200 m²/g, and the hydrosilylation catalyst of Synthesis Example 5 in an amount to give 30 ppm of platinum. The resulting composition had a pot life of more than 72 hours at 25° C. When heated at 105° C. for 15 minutes, it completely cured into a rubber elastomer.

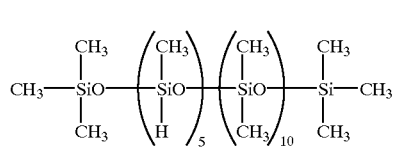

(1)

Example 2

The following components were mixed: 100 g of polydimethylsiloxane blocked with a dimethylvinylsiloxy radical at each end of its molecular chain and having a viscosity of 30,000 centistokes at 25° C., 9 g of polymethylhydrogensiloxane blocked with a trimethylsilyl radical at each end and having an average degree of polymerization of 50 (SiH radicals: 0.0158 mol/g), 5 g of polydimethylsiloxane blocked with a hydroxyl radical at each end and having an average degree of polymerization of 20, 10 g of fumed silica surface treated with dimethyldichlorosilane and having a specific surface area of 200 m²/g, and the hydrosilylation catalyst of Synthesis Example 1 in an amount to give 30 ppm of platinum. The resulting composition had a pot life of more than 100 hours at 25° C. When heated at 105° C. for 5 minutes, it completely cured into a sponge foam having uniform fine cells with a diameter of less than 1 mm.

Example 3

The following components were mixed: 100 g of polydimethylsiloxane blocked with a hydroxyl radical at each end of its molecular chain and having a viscosity of 20,000 centistokes at 25° C., 9 g of polymethylhydrogensiloxane blocked with a trimethylsilyl radical at each end and having an average degree of polymerization of 50 (SiH radicals: 0.0158 mol/g), 5 g of polydimethylsiloxane blocked with a hydroxyl radical at each end and having an average degree of polymerization of 20, 10 g of fumed silica surface treated with dimethyldichlorosilane and having a specific surface area of 200 m²/g, and the hydrosilylation catalyst of Synthesis Example 6 in an amount to give 30 ppm of platinum. The resulting composition had a pot life of more than 100 hours at 25° C. When heated at 120° C. for 10 minutes, it completely cured into a sponge foam having uniform fine cells with a diameter of less than 1 mm.

Example 4

The following components were mixed: 100 g of polydimethylsiloxane blocked with a dimethylvinylsiloxy radical at each end of its molecular chain and having a viscosity of 30,000 centistokes at 25° C., 9 g of polymethylhydrogensiloxane blocked with a trimethylsilyl radical at each end and having an average degree of polymerization of 50 (SiH radicals: 0.0158 mol/g), 5 g of polydimethylsiloxane blocked with a hydroxyl radical at each end and having an average degree of polymerization of 20, 10 g of fumed silica surface treated with dimethyldichlorosilane and having a specific surface area of 200 m²/g, and the hydrosilylation catalyst of Synthesis Example 7 in an amount to give 30 ppm of platinum. The resulting composition had a pot life of about 20 hours at 25° C. When heated at 105° C. for 10 minutes, it completely cured into a sponge foam having uniform fine cells with a diameter of less than 1 mm.

Example 5

The following components were mixed: 100 g of polydimethylsiloxane blocked with a dimethylvinylsiloxy radical at each end of its molecular chain, having one branched site in its molecule and having a viscosity of 1,000 centistokes at 25° C., 6 g of polydimethylsiloxane blocked with a dimethylhydrogensilyl radical at each end and having an average degree of polymerization of 30 (SiH radicals: 0.085 mol/100 g), and the hydrosilylation catalyst of Synthesis Example 3 in an amount to give 30 ppm of platinum. The resulting composition had a pot life of about 6 hours at 25° C. When heated at 105° C. for 15 minutes, it completely cured into a gel elastomer.

Example 6

The following components were mixed: 100 g of polydimethylsiloxane blocked with a dimethylvinylsiloxy radical at each end of its molecular chain and having a viscosity of 30,000 centistokes at 25° C., 9 g of polymethylhydrogensiloxane blocked with a trimethylsilyl radical at each end and having an average degree of polymerization of 50 (SiH radicals: 0.0158 mol/g), 5 g of polydimethylsiloxane blocked with a hydroxyl radical at each end and having an average degree of polymerization of 20, 10 g of fumed silica surface treated with dimethyldichlorosilane and having a specific surface area of 200 m²/g, and the hydrosilylation catalyst of Synthesis Example 4 in an amount to give 30 ppm of platinum. The resulting composition had a pot life of more than 100 hours at 25° C. When heated at 105° C. for 5 minutes, it completely cured into a sponge foam having uniform fine cells with a diameter of less than 1 mm.

Comparative Example 1

The following components were mixed: 100 g of polydimethylsiloxane blocked with a dimethylvinylsiloxy radical at each end of its molecular chain and having a viscosity of 30,000 centistokes at 25° C., 1.8 g of methylhydrogenpolysiloxane of the average molecular formula (1), 10 g of fumed silica surface treated with dimethyldichlorosilane and having a specific surface area of 200 m²/g, and a vinyl-containing siloxane complex derived from chloroplatinic acid in an amount to give 30 ppm of platinum. The resulting composition cured within 1 minute when left to stand at 25° C.

Comparative Example 2

The following components were mixed: 100 g of polydimethylsiloxane blocked with a dimethylvinylsiloxy radical at each end of its molecular chain and having a viscosity of 30,000 centistokes at 25° C., 1.8 g of methylhydrogenpolysiloxane of the average molecular formula (1), 10 g of fumed silica surface treated with dimethyldichlorosilane and having a specific surface area of 200 m²/g, and an amount to give 30 ppm of platinum of a hydrosilylation catalyst which was prepared by adding 5 g of a platinum/vinyl-containing siloxane complex (platinum 0.1% by weight) to 5 g of n-octacosane (melting point 64° C.), and heat treating the mixture at 80° C. for one hour, followed by stripping and cooling. The resulting composition cured within 1 minute when left to stand at 25° C.

Comparative Example 3

The following components were mixed: 100 g of polydimethylsiloxane blocked with a dimethylvinylsiloxy radical at each end of its molecular chain and having a viscosity of 30,000 centistokes at 25° C., 1.8 g of methylhydrogenpolysiloxane of the average molecular formula (1), 10 g of fumed silica surface treated with dimethyldichlorosilane and having a specific surface area of 200 m²/g, and an amount to give 30 ppm of platinum of a hydrosilylation catalyst which was prepared by enclosing 5 g of a platinum/vinyl-containing siloxane complex (platinum 0.1% by weight) in 5 g of a silicone resin consisting of 80 mol % of $(C_6H_5)SiO_{3/2}$ units and 20 mol % of $(CH_2=CH)SiO_{3/2}$ units and having a melting point of 50 to 85° C. The resulting composition had a pot life of 5 hours at 25° C. It slowly cured by heating at 120° C. for 20 minutes.

Comparative Example 4

The following components were mixed: 100 g of polydimethylsiloxane blocked with a dimethylvinylsiloxy radical at each end of its molecular chain and having a viscosity of 30,000 centistokes at 25° C., 1.8 g of methylhydrogenpolysiloxane of the average molecular formula (1), 10 g of fumed silica surface treated with dimethyldichlorosilane and having a specific surface area of 200 m²/g, and an amount to give 30 ppm of platinum of a hydrosilylation catalyst which was prepared by enclosing 5 g of a platinum/vinyl-containing siloxane complex (platinum 0.1% by weight) in 5 g of a silicone resin consisting of 70 mol % of $(C_6H_5)SiO_{3/2}$ units and 30 mol % of $(C_3H_7)SiO_{3/2}$ units and having a melting point of 35 to 70° C. The resulting composition completely cured by heating at 100° C. for 5 minutes, but had a pot life of only 15 minutes at 25° C.

Comparative Example 5

The following components were mixed: 100 g of polydimethylsiloxane blocked with a dimethylvinylsiloxy radical at each end of its molecular chain and having a viscosity of 30,000 centistokes at 25° C., 9 g of polymethylhydrogensiloxane blocked with a trimethylsilyl radical at each end and having an average degree of polymerization of 50 (SiH radicals: 0.0158 mol/g), 5 g of polydimethylsiloxane blocked with a hydroxyl radical at each end and having an average degree of polymerization of 20, 10 g of fumed silica surface treated with dimethyldichlorosilane and having a specific surface area of 200 m²/g, and an amount to give 30 ppm of platinum of a vinyl-containing siloxane complex derived from chloroplatinic acid. The resulting composition cured within 1 minute when left to stand at 25° C.

Comparative Example 6

The following components were mixed: 100 g of polydimethylsiloxane blocked with a dimethylvinylsiloxy radical at each end of its molecular chain and having a viscosity of 30,000 centistokes at 25° C., 9 g of polymethylhydrogensiloxane blocked with a trimethylsilyl radical at each end and having an average degree of polymerization of 50 (SiH radicals: 0.0158 mol/g), 5 g of polydimethylsiloxane blocked with a hydroxyl radical at each end and having an average degree of polymerization of 20, 10 g of fumed silica surface treated with dimethyldichlorosilane and having a specific surface area of 200 m²/g, 0.02 g of 3,5-dimethyl-1-hexyne-3-ol (melting point −68° C.), and an amount to give 30 ppm of platinum of a vinyl-containing siloxane complex derived from chloroplatinic acid. The resulting composition had a pot life of 24 hours at 25° C. When the composition was heated at 105° C. for 5 minutes, it remained undercured with noticeable tack.

Japanese Patent Application No. 333540/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A hydrosilylation catalyst comprising 0.1 to 50% by weight calculated as platinum atom of a platinum catalyst, the platinum catalyst being enclosed in a compound having a melting point of 40 to 200° C. and containing at least one member selected from the group consisting of an aliphatic unsaturated bond, carbonyl radical, carboxyl radical, and thioether radical.

2. The hydrosilylation catalyst of claim 1, wherein said compound has a molecular weight of up to 1,000.

3. The hydrosilylation catalyst of claim 1, which has been prepared by a process comprising the step of contacting said platinum catalyst with said compound in a molten or dissolved state.

4. The hydrosilylation catalyst of claim 2, wherein said compound contains an aliphatic unsaturated bond and an aromatic ring in a molecule.

5. A silicone composition comprising,
   (A) 100 parts by weight of an organopolysiloxane containing at least two alkenyl radicals or at least two hydroxyl radicals or both in a molecule,
   (B) an organohydrogenpolysiloxane containing at least two hydrogen atoms each directly attached to a silicon atom in a molecule, in such an amount that 0.4 to 20 mol of silicon atom-attached hydrogen atoms are available per 1 mol of the sum of alkenyl and hydroxyl radicals in component (A), and
   (C) a hydrosilylation catalyst according to claim 1, in such an amount that 0.1 to 1,000 parts by weight of platinum atom is available per million parts by weight of components (A) and (B) combined.

6. The hydrosilylation catalyst of claim 1, wherein said platinum catalyst is present in an amount of 0.1 to 10% by weight calculated as platinum atom.

7. The hydrosilylation catalyst of claim 6, wherein said platinum catalyst is present in an amount of 0.2 to 5% by weight calculated as platinum atom.

8. The hydrosilylation catalyst of claim 1, wherein said compound has a melting point of 40 to 150° C.

9. The hydrosilylation catalyst of claim 8, wherein the compound has a melting point of 40 to 100° C.

10. The hydrosilylation catalyst of claim 2, wherein said compound has a molecular weight of 50 to 500.

* * * * *